United States Patent
Ma (10) Patent No.: US 11,579,885 B2
(45) Date of Patent: Feb. 14, 2023

(54) METHOD FOR REPLENISHING A THREAD QUEUE WITH A TARGET INSTRUCTION OF A JUMP INSTRUCTION

(71) Applicant: ADVANCED NEW TECHNOLOGIES CO., LTD., Grand Cayman (KY)

(72) Inventor: Ling Ma, Hangzhou (CN)

(73) Assignee: ADVANCED NEW TECHNOLOGIES CO., LTD., George Town (KY)

(*) Notice: Subject to any disclaimer, the term of this patent is extended or adjusted under 35 U.S.C. 154(b) by 23 days.

(21) Appl. No.: 17/082,509

(22) Filed: Oct. 28, 2020

(65) Prior Publication Data

US 2021/0042122 A1     Feb. 11, 2021

Related U.S. Application Data

(63) Continuation of application No. PCT/CN2019/092241, filed on Jun. 21, 2019.

(30) Foreign Application Priority Data

Aug. 14, 2018  (CN) .......................... 201810922723.5

(51) Int. Cl.
G06F 9/38      (2018.01)
G06F 12/0875   (2016.01)

(52) U.S. Cl.
CPC ............ *G06F 9/3814* (2013.01); *G06F 9/384* (2013.01); *G06F 9/3818* (2013.01);
(Continued)

(58) Field of Classification Search
CPC .... G06F 9/3802; G06F 9/3814; G06F 9/3818; G06F 9/3836; G06F 9/3842; G06F 8/445;
(Continued)

(56) References Cited

U.S. PATENT DOCUMENTS 5,870,577 A    2/1999  Patel et al.
5,956,753 A *  9/1999  Glew ................... G06F 9/3834
                                                    711/205
(Continued)

FOREIGN PATENT DOCUMENTS

CN    1673955 A     9/2005
CN    1692331 A    11/2005
(Continued)

OTHER PUBLICATIONS

International Search Report and Written Opinion of the International Searching Authority for International Application No. PCT/CN2019/092241, dated Sep. 19, 2019, with partial machine English translation, 10 pages.
(Continued)

*Primary Examiner* — David J. Huisman
*Assistant Examiner* — Kasim Alli (57) ABSTRACT

Methods and electronic circuits for executing instructions in a central processing unit (CPU) are provided. One of the methods includes forming an instruction block by sequentially fetching, from a current thread queue, one or more instructions including one jump instruction, wherein the jump instruction is the last instruction in the instruction block; transmitting the instruction block to a CPU execution unit for execution; replenishing the current thread queue with at least one instruction to form a thread queue to be executed; determining a target instruction of the jump instruction according to an execution result of the CPU execution unit; determining whether the target instruction is contained in the thread queue to be executed; and if not, flushing the thread queue to be executed, obtaining the target instruction and adding the target instruction to the thread queue to be executed.

20 Claims, 3 Drawing Sheets

(52) U.S. Cl.
CPC ......... *G06F 9/3851* (2013.01); *G06F 9/3861* (2013.01); *G06F 12/0875* (2013.01); *G06F 2212/452* (2013.01)

(58) Field of Classification Search
CPC ........... G06F 12/0875; G06F 2212/452; G06F 9/384; G06F 9/3851; G06F 9/3861
See application file for complete search history.

(56) References Cited

U.S. PATENT DOCUMENTS

| | | | |
|---|---|---|---|
| 6,185,675 B1 * | 2/2001 | Kranich | G06F 9/3804 711/125 |
| 6,339,822 B1 * | 1/2002 | Miller | G06F 9/30149 711/125 |
| 6,647,462 B1 * | 11/2003 | Miretsky | G06F 9/3802 710/68 |
| 6,691,221 B2 | 2/2004 | Joshi et al. | |
| 7,024,663 B2 | 4/2006 | Klein | |
| 7,076,640 B2 * | 7/2006 | Kadambi | G06F 9/30058 712/233 |
| 7,475,231 B2 | 1/2009 | Tran | |
| 7,711,929 B2 | 5/2010 | Burky et al. | |
| 7,761,697 B1 | 7/2010 | Coon et al. | |
| 7,836,287 B2 | 11/2010 | Doing et al. | |
| 7,953,933 B1 * | 5/2011 | Thaik | G06F 9/3836 711/125 |
| 8,448,140 B2 | 5/2013 | Isshiki et al. | |
| 8,601,239 B2 | 12/2013 | Yoshida et al. | |
| 8,812,822 B2 | 8/2014 | Luick | |
| 9,298,469 B2 | 3/2016 | Busaba et al. | |
| 9,311,093 B2 | 4/2016 | Gschwind et al. | |
| 9,389,869 B2 | 7/2016 | Tran | |
| 9,424,036 B2 | 8/2016 | Gschwind et al. | |
| 9,477,469 B2 | 10/2016 | Gschwind et al. | |
| 9,535,695 B2 | 1/2017 | Mylius et al. | |
| 10,331,454 B2 * | 6/2019 | Combs | G06F 9/3822 |
| 10,503,538 B2 | 12/2019 | Gschwind et al. | |
| 2002/0147758 A1 | 10/2002 | Lee | |
| 2003/0014613 A1 * | 1/2003 | Soni | G06F 9/3855 712/217 |
| 2004/0049660 A1 | 3/2004 | Jeppesen et al. | |
| 2005/0216703 A1 | 9/2005 | Diefenderfer et al. | |
| 2006/0095733 A1 | 5/2006 | Lee et al. | |
| 2006/0149933 A1 | 7/2006 | Eickemeyer et al. | |
| 2006/0179279 A1 | 10/2006 | Jones et al. | |
| 2006/0265573 A1 | 11/2006 | Smith et al. | |
| 2007/0288736 A1 | 12/2007 | Luick | |
| 2008/0005544 A1 | 1/2008 | Jourdan et al. | |
| 2008/0270757 A1 | 10/2008 | Nemirovsky et al. | |
| 2013/0086368 A1 | 4/2013 | Gschwind et al. | |
| 2014/0281424 A1 | 9/2014 | Bobba et al. | |
| 2015/0100763 A1 * | 4/2015 | Holm | G06F 9/3017 712/210 |
| 2015/0106598 A1 | 4/2015 | Kahlich | |
| 2016/0041828 A1 | 2/2016 | Klein | |
| 2016/0378488 A1 | 12/2016 | Burger et al. | |
| 2016/0378491 A1 | 12/2016 | Burger et al. | |
| 2017/0132140 A1 | 5/2017 | Lin | |
| 2017/0315813 A1 | 11/2017 | Smith et al. | |
| 2018/0095766 A1 | 4/2018 | Friedmann et al. | |
| 2019/0163489 A1 * | 5/2019 | Karve | G06F 9/3836 |

FOREIGN PATENT DOCUMENTS

| | | |
|---|---|---|
| CN | 1790256 A | 6/2006 |
| CN | 101118486 A | 2/2008 |
| CN | 101223504 A | 7/2008 |
| CN | 101770358 A | 7/2010 |
| CN | 102520913 A | 6/2012 |
| CN | 102968293 A | 3/2013 |
| CN | 103677965 A | 3/2014 |
| CN | 103984523 A | 8/2014 |
| CN | 104156196 A | 11/2014 |
| CN | 104731557 A | 6/2015 |
| CN | 104978282 A | 10/2015 |
| CN | 104793921 A | 11/2015 |
| CN | 105308557 A | 2/2016 |
| CN | 105786448 A | 7/2016 |
| CN | 106990942 A | 7/2017 |
| CN | 107688468 A | 2/2018 |
| CN | 107810479 A | 3/2018 |
| CN | 107918547 A | 4/2018 |
| CN | 109101276 A | 12/2018 |
| GB | 2495362 A | 4/2013 |
| WO | 2007141252 A1 | 12/2007 |
| WO | 2014121738 A1 | 8/2014 |
| WO | 2015165017 A1 | 11/2015 |
| WO | 2018057222 A1 | 3/2018 |

OTHER PUBLICATIONS

First Search Report and Office Action for Taiwanese Application No. 108120456, dated Sep. 15, 2020, with machine English Translation, 11 pages.
First Search Report for Chinese Application No. 201810922723.5, dated Jan. 6, 2020, 1 page.
First Office Action for Chinese Application No. 201810922723.5, dated Jan. 14, 2020, 15 pages.
Second Office Action for Chinese Application No. 201810922723.5, dated Mar. 13, 2020, 9 pages.
Supplementary Search Report for Chinese Application No. 201810922723.5, dated Mar. 2, 2020, 1 page.
Search Report for European Application No. 19 849 120.1 dated May 10, 2021.
Written Opinion and Search Report for Singapore Patent Application No. 11202010825Q dated Mar. 28, 2022.

* cited by examiner

METHOD FOR REPLENISHING A THREAD QUEUE WITH A TARGET INSTRUCTION OF A JUMP INSTRUCTION

CROSS-REFERENCE TO RELATED APPLICATIONS

The application is a continuation application of International Patent Application No. PCT/CN2019/092241, filed on Jun. 21, 2019, and entitled "METHOD FOR EXECUTING INSTRUCTIONS IN CPU." The PCT application claims priority to and benefits of the Chinese Patent Application No. 201810922723.5, filed on Aug. 14, 2018. All of the above-referenced applications are incorporated herein by reference in their entirety.

TECHNICAL FIELD

One or more embodiments described by the specification relate to the field of computer hardware chips, and particularly relate to a method for executing instructions in a Central Processing Unit (CPU).

BACKGROUND

In the contemporary big data cloud environment, the storage and processing of massive data are necessary, imposing higher requirements on how fast data is computed. It is well known that CPU performance is one determinant factor of computation speed. In order to enable faster computation, CPU is being constantly improved in various aspects, from physical process to logical control.

For example, to improve parallel processing power, the CPU hyper-threading technology has been proposed, in which hardware instructions of special characters are utilized to simulate a physical chip from two logical cores. In this way, a single processor is capable of thread-level parallel computation and thus compatible with multithreading parallel computation. In other words, a hyper-threaded CPU can run two or more threads in parallel on a single physical core, increasing the number of parallelizable instructions and exhibiting improved overall operating performance.

On the other hand, instruction prediction schemes are used to perform pre-fetching and pre-execution of instructions, to utilize a CPU's clock cycles more efficiently and avoiding pipeline bubbles or stalls.

These schemes have improved CPU execution efficiency to a certain extent. However, instruction prediction is not always accurate, and prediction misses can significantly deteriorate CPU execution efficiency.

Therefore, further improvements are desired to achieve higher CPU efficiency.

SUMMARY

One or more embodiments of the specification provide methods and electronic circuits for executing instructions in a CPU, which further improves CPU execution efficiency by leveraging the advantages of existing instruction prediction techniques while avoiding the execution of mis-predicted instructions.

According to a first aspect, a method for executing instructions in a CPU is provided. The method includes: forming an instruction block by sequentially fetching, from a current thread queue, one or more instructions, wherein the instruction block contains one jump instruction, and the jump instruction is the last instruction in the instruction block; transmitting the instruction block to a CPU execution unit for execution; replenishing the current thread queue with at least one instruction to form a thread queue to be executed; determining a target instruction of the jump instruction according to an execution result of the CPU execution unit; determining whether the target instruction is contained in the thread queue to be executed; and in response to determining that the target instruction is not contained in the thread queue to be executed, flushing the thread queue to be executed, obtaining the target instruction and adding the target instruction to the thread queue to be executed.

In some embodiments, forming an instruction block by sequentially fetching, from a current thread queue, one or more instructions comprises: reading a predetermined threshold number of instructions from the current thread queue, the predetermined threshold number depending on the number of CPU execution units; determining whether the jump instruction is present in the predetermined threshold number of instructions; and in response to determining that the jump instruction is present in the predetermined threshold number of instructions, taking the jump instruction and one or more preceding instructions thereof contained in the predetermined threshold number of instructions as the instruction block.

In some embodiments, replenishing the current thread queue with at least one instruction to form a thread queue to be executed comprises: replenishing the current thread queue with at least one instruction corresponding to a predicted branch.

In some embodiments, replenishing the current thread queue with at least one instruction to form a thread queue to be executed comprises: replenishing the current thread queue with one or more instructions from a decoded cache, wherein the decoded cache stores a plurality of pre-fetched and decoded instructions.

In some embodiments, the jump instruction is a register operation instruction.

In some embodiments, the instruction block further includes at least one memory operation instruction.

In some embodiments, determining a target instruction of the jump instruction according to an execution result of the CPU execution unit comprises: determining the target instruction of the jump instruction before execution of the at least one memory operation instruction is completed.

In some embodiments, obtaining the target instruction comprises: determining whether the target instruction is present in a decoded cache, wherein the decoded cache stores a plurality of pre-fetched and decoded instructions; in response to determining that the target instruction is present in the decoded cache, obtaining the target instruction from the decoded cache; and in response to determining that the target instruction is not present in the decoded cache, obtaining the target instruction from a memory.

According to a second aspect, a CPU controller circuit is provided. The CPU controller circuit is communicatively connected to a memory and a plurality of CPU execution units. The CPU controller circuit comprises: an instruction fetching logic circuit configured to sequentially fetch, from a current thread queue, one or more instructions to form an instruction block and transmit the instruction block to a CPU execution unit for execution, wherein the instruction block contains one jump instruction, and the jump instruction is the last instruction in the instruction block; an instruction replenishing logic circuit configured to replenish the current thread queue with at least one instruction to form a thread queue to be executed; a target determination logic circuit configured to determine a target instruction of the jump instruction according to an execution result of the CPU execution unit; a determination logic circuit configured to determine whether the target instruction is contained in the thread queue to be executed; and a queue handling logic circuit configured to, in response to the target instruction not being contained in the thread queue to be executed, flush the thread queue to be executed, obtain the target instruction and add the target instruction to the thread queue to be executed.

According to a third aspect, a central processing unit (CPU) is provided. The CPU comprises the CPU controller as provided in the second aspect and a plurality of CPU execution units.

In embodiments described hereinafter, while instructions can be pre-fetched and put into a decoded cache and thread queues by using existing techniques, each instruction block sent for execution is guaranteed to contain at most one jump instruction and the jump instruction is the last instruction of the block. In addition, before a target instruction of the jump instruction is determined, renaming and allocation of executable resources for subsequent instructions in the thread queue are suspended. After the target instruction is determined, instructions in the thread queue are compared with the target instruction to determine whether they match the target instruction. In this way, it is ensured that correct target instructions are executed. Thus, overall CPU execution efficiency is enhanced by leveraging the advantages of existing instruction prediction schemes while avoiding time-consuming loop-back operations required when mis-predicted instructions are executed.

BRIEF DESCRIPTION OF THE DRAWINGS

In order to more clearly explain the subject matter of embodiments of the specification, the accompanying drawings, to which reference is to be made in connection with the following description of embodiments, will be briefed below. These drawings show merely some embodiments of the specification, and those of ordinary skill in the art can obtain other drawings in light of those contained herein, without making any creative effort.

DETAILED DESCRIPTION

The subject matter disclosed herein will be described with reference to the accompanying drawings.

Figure 1:
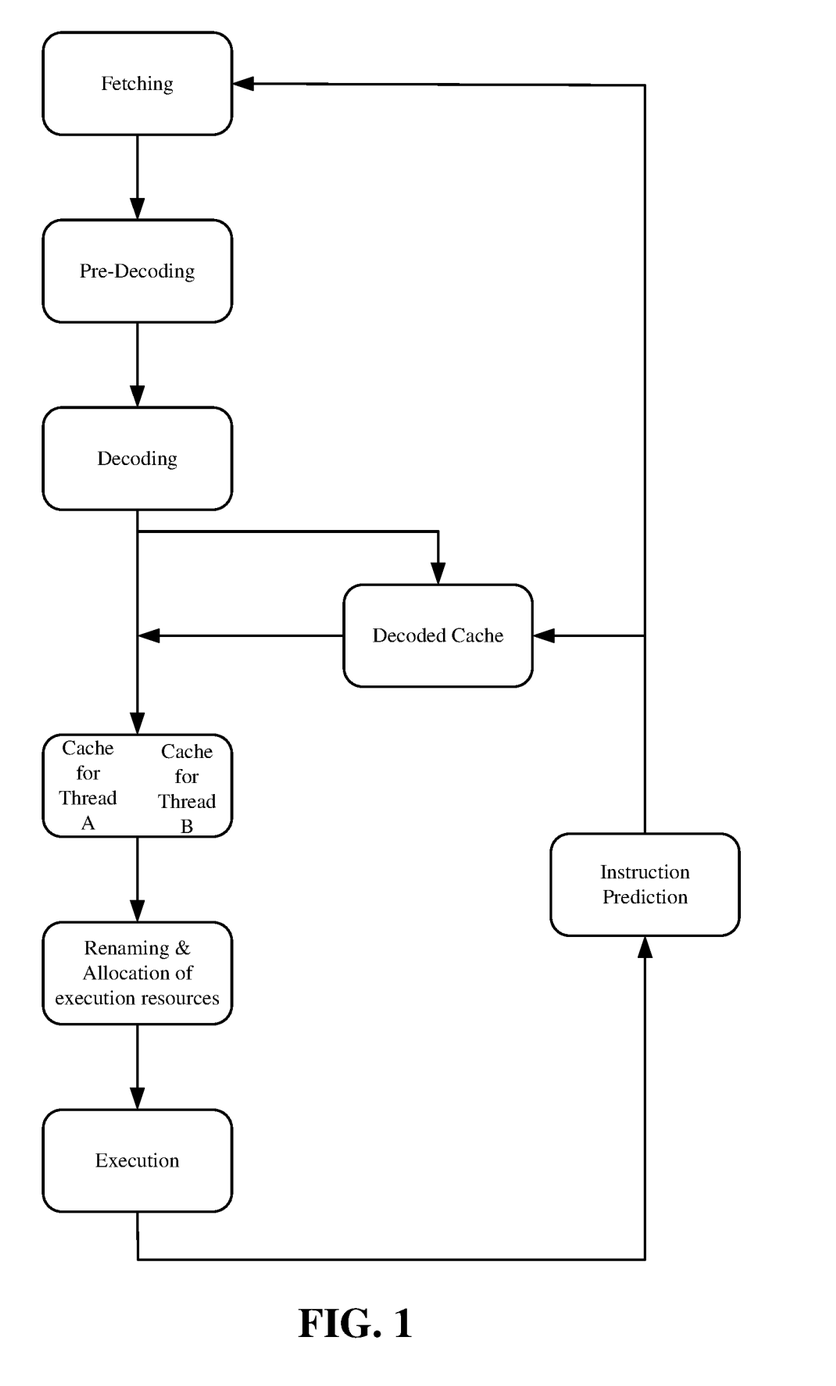
FIG. 1 shows an execution process in a CPU according to some embodiments.

FIG. 1 shows an execution process in a CPU according to one embodiment. As shown in FIG. 1, the execution process is divided to multiple phases and begins with an Instruction Fetching phase. For current mainstream CPUs, up to 16 bytes, equivalent to about 4 instructions, can be fetched in each instruction cycle. The fetched instructions are then pre-decoded. The main purpose of this Pre-Decoding phase is to identify lengths of the instructions and mark any jump instruction therein. Generally, mainstream CPUs have a throughput of 5 instructions per cycle in this phase.

The Pre-Decoding phase is followed by a Decoding phase primarily for transforming complex instructions into simpler (fixed-length) instructions and specifying types of operations to be performed thereon. Usually, this phase also provides a throughput of 5 instructions per cycle. The decoded instructions are stored in a decoded cache.

As a cache pool for instructions, the decoded cache can store a plurality of decoded instructions to be read in the subsequent Thread Queue phase. A throughput for the decoded cache to feed instructions to the next phase can be up to 6 jump instructions per cycle.

As described above, for a hyper-threaded CPU, multiple threads can be executed in parallel. During the execution, each thread reads instructions to be executed next, forming its own thread cache queue, also referred to as thread queue hereinafter. If there is any instruction to be executed stored in the decoded cache, the queue is replenished with the instruction stored in the decoded cache. Otherwise, corresponding instructions may be added to the queue from the front end (e.g., memory such as RAM). While FIG. 1 only illustrates queues of threads A and B, the hyper-threaded CPU may also support the parallel execution of more threads.

The Thread Queue phase is followed by the next phase: Renaming & Allocation of executable resources. A throughput from Thread Queue to this phase may be up to 5 jump instructions per cycle. The Renaming & Allocation phase is mainly for maximizing the number of instructions executable in parallel by addressing read and write dependencies of registers and removing unnecessary dependencies, as well as for allocating various resources necessary for execution.

Following the allocation of necessary resources for execution, the instructions may be fed to the CPU execution units for execution. A modern CPU has multiple execution units. Currently, the most common CPUs has 8 parallel execution pipelines. For example, 8 micro-operations per each cycle may be executed. Although instructions can be executed in random order, they are finally submitted in the same order as that of the program.

As described above, in order to avoid pipeline bubbles or stalls caused by missing instructions, almost all of the existing CPUs employ instruction prediction (also referred to as branch prediction) schemes for prediction and pre-fetching of instructions. At the end of each cycle, the prediction unit predicts, based on an execution-status history table it maintains, the instructions to be pre-fetched next. If there is no jump instruction, then a 16-byte instruction block starting at the current fetch address will be fetched in the Instruction Fetching phase. Otherwise, instructions will be fetched according to instruction prediction result.

After continuous improvement, existing instruction prediction schemes have achieved prediction accuracy over 90%, and some of them can even reach up to 98%. However, there remains possible misprediction that may introduce wrong instruction block into an execution unit.

For example, assuming there are instructions L1, L2, L3, L4, L5, and L2 is a jump instruction specifying that, if some condition is satisfied, the control will jump to instruction L5 for execution; otherwise, the instructions L3 and L4 will be executed sequentially. If, when predicting the instructions, the target branch of the jump instruction L2 is predicted to be L3, then L3 and the subsequent instruction will be read in the Instruction Fetching phase, likely leading to feeding and execution of L1, L2, L3, L4 in the CPU execution units in subsequent phases. If executing L2 will actually result in a jump to L5, the execution of L3 and L4 will give rise to an error. In this case, the CPU may have to refresh the entire pipeline, loop back to the previous branch, hot restart again and select another branch for execution. Although such a prediction error is less likely to occur, it necessitates the above set of operations, which is very time-consuming and finally limits the CPU efficiency to only 75% or below.

In view of this, embodiments disclosed herein provide an improved scheme, which maintains and leverages the high-accuracy advantages of the existing instruction prediction schemes as much as possible while avoiding the execution of mis-predicted instructions. According to one or more embodiments, instructions are fetched and put into a decoded cache and thread queues in existing manners, but before a valid target address is obtained for a jump instruction, i.e., prior to determining a target instruction, renaming and allocation of executable resources will not be carried out, thus ensuring correct subsequent execution and avoiding reduced efficiency caused by misprediction. The embodiments of this concept will be detailed below.

Figure 2:
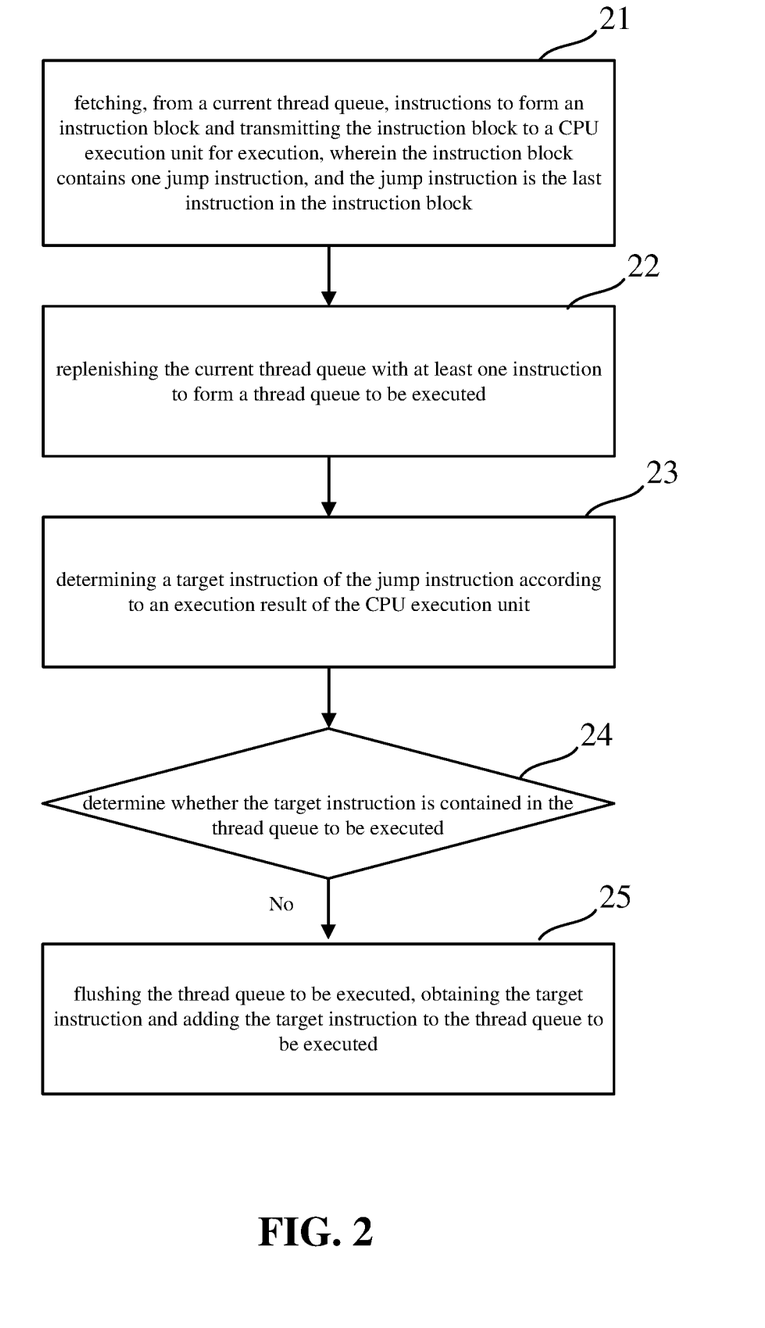
FIG. 2 shows a method for executing instructions in a CPU according to some embodiments.

FIG. 2 is a flowchart of a method for executing instructions in a CPU according to one embodiment. As shown in FIG. 2, the method includes: in step 21, fetching, from a current thread queue, instructions to form an instruction block and transmitting the instruction block to a CPU execution unit for execution, wherein the instruction block contains a jump instruction, and the jump instruction is the last instruction in the instruction block (for example, there is at most one jump instruction contained in the instruction block and the jump instruction is at the end of the block); in step 22, replenishing the current thread queue with at least one instruction to form a thread queue to be executed; in step 23, determining a target instruction of the jump instruction according to an execution result of the CPU execution unit; in step 24, determining whether the target instruction is contained in the thread queue to be executed; if the target instruction is not contained in the thread queue to be executed, in step 25, flushing the thread queue to be executed, obtaining the target instruction and adding the target instruction to the thread queue to be executed. These steps will be described in greater detail below.

As described above, according to embodiments disclosed hereinafter, in order to leverage the advantages of the existing instruction prediction schemes, instructions may be fetched and put into a decoded cache and thread queues using existing techniques. In other words, the Instruction Fetching, Pre-Decoding and Decoding phases shown in FIG. 1 may be implemented using existing techniques, and the decoded instructions are stored in a decoded cache. In addition, various threads can read instructions from the decoded cache to form respective thread queues. Therefore, it is assumed herein that thread queues have been formed by using existing techniques, before step 21.

In step 21, fetching, from a current thread queue, instructions to form an instruction block and transmitting the instruction block to a CPU execution unit for execution.

If the instructions fetched from the current thread queue do not contain any jump instruction, then an instruction block with a maximum length corresponding to maximum processing power of the CPU hardware may be formed by using existing techniques. Generally, such maximum processing power depends on the number of execution units that the CPU possesses, and the maximum length of the instruction block may be a predetermined threshold determined according to the number of execution units. For example, currently, the most commonly used CPUs each has 8 parallel pipelines. So, the predetermined threshold and the maximum instruction block length may be both set to 8 accordingly. When the 8 fetched instructions do not contain any jump instruction, they can be treated and processed as a normal instruction block.

Differing from existing schemes, when the fetched instructions contain a jump instruction, in some embodiments, it is ensured that each instruction block delivered to a respective one of the CPU execution units contains only one jump instruction and the jump instruction is the last instruction of the instruction block. For example, during transfer of instructions from the thread queues to the CPU execution units, types of the instructions are ascertained, and instruction blocks are formed with jump instructions as their boundaries, so that in each set of instructions delivered to the respective CPU execution unit, the jump instruction is the last instruction.

These instruction blocks can be formed in different ways. In one embodiment, a predetermined threshold number of instructions are read from the current thread queue at each time, the predetermined threshold number corresponding to the CPU's maximum processing power, i.e., depending upon the number of the CPU execution units. After that, a check is performed to find out if there is any jump instruction in the read-out instructions. If not, as described above, these instructions are taken as an instruction block. Otherwise, if these instructions contain a jump instruction, then this jump instruction and all preceding instruction(s) contained in these read-out instructions are taken as an instruction block, with the jump instruction as the end.

For example, assuming the predetermined threshold is 8, 8 instructions are read out from the current thread queue at one time. If there is no jump instruction in these 8 instructions, these 8 instructions are treated as an instruction block and fed to one of the CPU execution units. If there is a jump instruction contained in the 8 instructions, then an instruction block is alternatively formed, including the jump instruction and the all preceding one(s) contained in the 8 instructions. For example, if the fifth instruction is a jump instruction, then the instruction block is formed by the first to fifth instructions, with the fifth instruction as the end.

In this way, it is ensured that in each set of instructions delivered to the respective CPU execution unit for execution, the jump instruction is the last instruction. It can be appreciated that, before a jump instruction is executed, it is difficult to accurately predict the next instruction to be executed, i.e., the target instruction. However, in the instruction prediction schemes, the predicted target instruction is to be pre-fetched into the thread queue. In order to overcome this, if it is ensured that the jump instruction is the last instruction in each set of instructions fed to the respective CPU execution unit, an isolation or break is established between the jump instruction and any predicted subsequent target instruction, ensuring that any predicted target instruction is not to be delivered to one of the CPU execution units along with a jump instruction. This creates opportunities and possibilities for accurately determining target instructions and correcting mis-predicted target instructions.

In the above example with instruction L2 out of instructions L1, L2, L3, L4, L5 being a jump instruction, even when the target instruction of the jump instruction is mistakenly predicted as L3, according to the above embodiments, L1 and L2 is to be fed to and executed in one of the CPU execution units as an instruction block, instead of feeding and executing L1, L2, L3, L4 as a block. As a result, when L1 and L2 are executed, an opportunity can be provided for determining the correct target branch of L2 and for correcting the previous target branch misprediction.

As described above, after at least some instructions are fetched from the thread queue and fed to the CPU execution units, there may be temporarily fewer instructions waiting for execution in the thread queue. Accordingly, during or after delivery of the resulting instruction block to the CPU execution units, the thread queue is replenished so that its length is maintained. In other words, in step 22, at least one instruction is replenished into the current thread queue to form a thread queue to be executed. In some embodiments, the "thread queue to be executed" refers to a thread queue from which the next instruction block is to be formed and transmitted to the CPU execution units for execution.

According to one embodiment, in this step, the thread queue to be executed may be formed, as conventionally practiced, i.e., by replenishing the thread queue with the instruction(s) according to the predicted branch of the instruction prediction. In one embodiment, according to an instruction prediction result, instruction(s) is/are read from a decoded cache storing multiple pre-fetched and decoded instructions and added to the current thread queue. In extremely rare situations, it is also possible to request instruction(s) from the front end (e.g., an RAM), which are decoded and replenished into the thread queue.

In some embodiments, after the instruction block formed in step 21 is transmitted to the respective CPU execution unit, the CPU execution unit may add the instructions therein to a pipeline so that they can be executed. In particular, the last instruction in the instruction block is a jump instruction, and when the jump instruction is executed, the target address jumped to is accurately determined, that is, the target instruction is determined. The target instruction may be the instruction stored in the target address. Thus, in step 23, the target instruction of the jump instruction is determined according to an execution result of the CPU execution unit.

In step 24, determining whether the thread queue to be executed formed by replenishment in step 23 contains the target instruction. If yes, this means that the target instruction to be executed next has been added to the thread queue to be executed due to a correct instruction prediction result, and no additional operation may be required. Thus, after the execution of the current instruction block is completed, a new instruction block can be fetched from the thread queue and executed in accordance with the method of FIG. 2.

However, if the thread queue to be executed does not contain the target instruction, this means that the instruction to be executed next (target instruction) is absent from the thread queue. In other words, the instruction sequence contained in the thread queue to be executed is not the one to be executed next. This may be because instruction misprediction has occurred, leading to pre-fetching of wrong instructions in the thread queue. In this situation, in step 25, flushing the current thread queue to be executed, and obtaining the target instruction and adding the target instruction to the thread queue to be executed.

In step 25, since the current thread queue to be executed contains wrong instructions which should not be executed, the current thread queue to be executed is first flushed. Flushing is a CPU operation that can clear away all the data stored in an object. Flushing the current thread queue to be executed may result in the deletion of all the instructions therein so that the queue becomes empty.

Following the flushing of the wrong instructions, the correct target instruction is obtained and added to the thread queue to be executed.

In one embodiment, it is first determined whether the correct target instruction is present in the decoded cache. If the correct target instruction is present, the target instruction is obtained from the decoded cache. The wrong branch instructions previously added in the thread queue are often due to an ordinal error in instruction execution scheduling.

As a large number of instructions are consecutively pre-fetched, decoded, and added to the decoded cache according to the instruction prediction schemes, in almost all situations, the correct target instruction may have been obtained from the decoded cache, and added to the thread queue to be executed. In addition, apart from adding the target instruction, one or more instructions succeeding it may also be added to the thread queue to be executed.

Nevertheless, in extremely rare situations, the target instruction is not present in the decoded cache. In such situations, a request may be made to the memory for the target instruction. Once obtained, the target instruction is decoded and added to the thread queue to be executed.

By the operation in step 25, it is ensured that the thread queue to be executed contains the correct branch instruction, and hence the correct instruction block is subsequently transmitted to a respective CPU execution unit, preventing the execution of any mis-predicted instruction by the execution unit.

The above process is further explained with reference to an example as follows. Assuming there is the following sequence of instructions (text enclosed by each /* . . . */ explains a corresponding one of the instructions):

Loop: 1. fld f0,0(x1) /* According to the address stored in x1, transfer content from memory to register f0 */
2. fadd.d f4,f0,f2 /* Save the result of f0+f2 to register f4*/
3. fsd f4, 0(x1) /* According to the address stored in x1, save data from f4 to memory */
4. addi x1,x1-8 /* Execute x1 minus "8" and save the result in register x1*/
5. bne x1, x2, Loop /*If x1 is not equal to x2, jump to Loop and execute instruction 1; otherwise proceed to instruction 6*/
6. addi x2, x2+1 /* Execute x2 plus "1" and save the result in register x2*/
7 . . .
8 . . .

In this sequence, the instruction 5 is a jump instruction for dispatching control to different branches, depending on whether x1 is equal to x2. The target instruction of first branch is the instruction 1, while the target instruction of the second branch is the instruction 6. It is assumed that these instructions have been pre-fetched, decoded and stored in the decoded cache by using existing techniques. It is also assumed that, according to an instruction prediction result, when the instruction 5 is executed, control will jump to the second branch for execution, so the instructions 1 to 8 are sequentially put into a thread queue.

In the conventional manner, the instructions 1 to 6 are likely to be regarded as an instruction block and transmitted to a respective CPU execution unit for execution. After instruction 5 is executed, the first branch, i.e., the instruction 1, is supposed to be executed. However, in the event of misprediction, the instruction 6 is mistakenly executed, necessitating the time-consuming flushing and loop-back operations and leading to a drastic reduction in CPU efficiency.

According to the scheme provided in embodiments described herein, in step 21, since the instruction 5 is a jump instruction, only the instructions 1 to 5 will be transmitted, as an instruction block, to a respective CPU execution unit for execution.

In step 22, replenishing the thread queue with instruction(s) from the decoded cache to form a thread queue to be executed. As the target branch is the instruction 6 according to the instruction prediction result, at this time, the thread queue to be executed may include the instruction 6, instruction 7 and the replenished instruction(s).

In step 23, the execution result of the CPU execution unit indicates that the target instruction of the jump instruction 5 is in fact the instruction 1 in the first branch.

Subsequently, in step 24, it may be determined that the target instruction 1 is not present in the thread queue to be executed. As a result, in step 25, the thread queue to be executed is flushed, and the instruction 1 is fetched from the decoded cache and added to the thread queue to be executed, thereby enabling the formation of a thread queue to be executed consistent with the correct branch.

Therefore, in the above embodiments, while instructions are pre-fetched and loaded into a decoded cache and a thread queue as conventionally practiced, each instruction block sent for execution is guaranteed to contain at most one jump instruction which is the last instruction in the block. In addition, before a target instruction of the jump instruction is determined, renaming and allocation of executable resources for subsequent instructions in the thread queue are suspended. After the target instruction is determined, instructions in the thread queue are compared with the target instruction to determine whether they match the target instruction. In this way, it is ensured that correct branch are executed, without suffering from deteriorated efficiency due to misprediction.

Increasing CPU execution efficiency requires maximizing the utilization of each execution cycle and minimizing pipeline bubbles and stalls as well as idle operations where no instruction is executed. In order to avoid decreases in efficiency caused by time-consuming loop-backs due to misprediction, the above-described scheme carries out determination and comparison on the thread queue once the target instruction of the jump instruction has been determined, to ensure the correctness of subsequent operations. In addition, to further clarify, such an "additional" operation will not lead to a pipeline stall or idle operation harming the CPU's execution efficiency. From research and analysis, It has been found that such an operation will not cause a waste of a CPU's execution cycles or a decrease in its execution efficiency. This will be discussed below in greater detail.

First, the optimized schemes described herein are immune from the issue of multiple idle cycles in which no instruction is executed. Generally, a number of instructions, e.g., 5 instructions, can be fetched in each CPU cycle. Statistics show that, on average, in the 5 instructions, there is 1 jump instruction, 1.4 memory read instructions, 1 memory write instruction and 1.6 instructions related to computing operations. Statistics also show that most jump instructions involve simple register operations, and the execution of each of them can be completed within a single cycle.

On the other hand, any memory operation may be accompanied by a long delay lasting for several cycles. For example, if a memory operation hits an L1 cache, a delay of 4 cycles will be required; if it hits an L2 cache, then a delay of 12 cycles will be required; and if it hits no cache, a delay of at least 50 cycles will be required for reading data from the memory. Therefore, by first executing jump instructions, it is possible to determine target addresses as early as possible without causing bubbles.

For example, continuing the above example with the instructions 1 to 5 out of the instructions 1 to 6 being fed as an instruction block to the execution unit, as the instruction 1 requires reading of data from the memory, even if an L1 cache is hit, it will require 4 cycles. Due to the dependencies between the instructions, the instructions 2 and 3 must be executed in succession, and this requires additional 2 cycles. Further, the instructions 4 and 5 are both register operations, each of which can be finished in one cycle. Thus, before the instructions 1, 2, 3 are finished, it is possible to know whether a jump is required at the instruction 5.

Additionally, current mainstream CPUs are multithreaded ones. For example, in the event of two threads, the CPU will fetch instructions alternately for these threads, at first for a thread A, then for a thread B, again for thread A, . . . . In this way, the thread A will periodically waits for one cycle, and target instructions of the jump instructions can be determined in these inherent waiting periods.

In fact, in the current big data environment enabled by cloud servers, performance issues are concentrated in memory access delays. Such delays usually span up to hundreds of instruction cycles and sufficient for determining target instructions of jump instructions and ensuring the correctness of thread queues while not affecting CPU operations. Therefore, the above operations in the present schemes will not introduce issues to CPUs, such as idle operations without instructions being executed, stalls, etc.

Another concern is the pre-fetching of instructions and data in the optimized and existing instruction prediction schemes. Conventional instruction prediction methods include an Instruction Pre-Execution phase, in which instructions that have not been ascertained can be run. From this point of view, the conventional methods can help the CPU pre-fetch many codes to be executed soon and reduce delays caused by missing instructions. The present schemes can also adopt this approach, except that correct instructions are executed only after target addresses of jump instructions have been determined. As for data pre-fetching, as the conventional instruction prediction methods allow instructions that have not been ascertained to be run in the Instruction Pre-Execution phase, data to be used soon can be transferred from the memory into the CPU's caches. In the embodiments disclosed herein, this approach may also be adopted, except that necessary data are read after target addresses have been ascertained and effective instructions have been executed.

Therefore, the schemes provided in the embodiments described herein can make full use of the advantages of conventional methods and combine them with the various characteristics and primary operating conditions of existing CPUs, thereby resulting in significantly enhanced CPU utilization and greatly improved throughput of cloud computing clusters.

As known to those skilled in the art, instructions are executed in a CPU under the control of a controller (also referred to a controller circuit, a control unit), which is a command and control center of the entire CPU and is configured to coordinate operations of various components therein. Such a controller generally includes instruction control logic, timing control logic, bus control logic, interruption control logic and other logics. The instruction control logic is configured for fetching, analysis and execution of instructions. The above described logics are also referred to as logic circuits.

A controller circuit, especially instruction control logic therein, may be adapted in the hardware level in accordance with the optimizations and modification made to the conventional instruction control schemes according to the above-described embodiments, so as to be able to effectuate the control process as described in the above embodiments.

Figure 3:
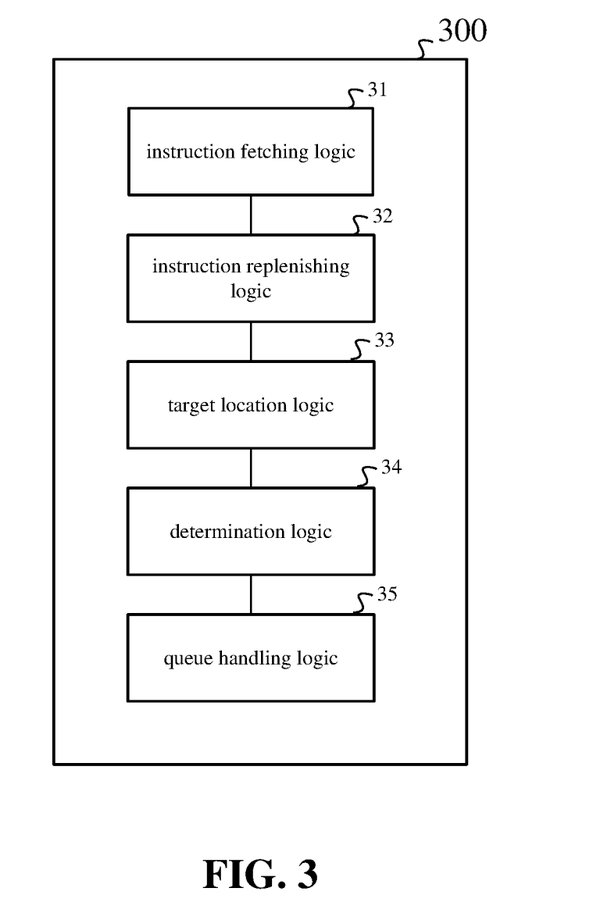
FIG. 3 shows a functional block diagram of a CPU controller according to some embodiments.

FIG. 3 shows a functional block diagram of a CPU controller according to one embodiment. The CPU controller circuit 300 is an internal electronic circuit of a CPU that is communicatively connected to a memory and a plurality of CPU execution units, e.g., Arithmetic Logic Units, for coordinating instructions and data flow between the CPU and other components of the computer. The CPU controller circuit 300 controls the operations of the CPU by sending timing and control signal. An Arithmetic Logic Unit (ALU) is an internal electronic circuitry of a CPU that performs all the arithmetic and logical operations in a computing device.

As shown in FIG. 3, the controller 300 may include: an instruction fetching logic circuit 31 configured to sequentially fetch, from a current thread queue, instructions to form an instruction block and transmit the instruction block to a CPU execution unit for execution, wherein the instruction block contains one jump instruction and the jump instruction is the last instruction in the instruction block; an instruction replenishing logic circuit 32 configured to replenish the current thread queue with at least one instruction to form a thread queue to be executed; a target location logic circuit 33 configured to determine a target instruction of the jump instruction according to an execution result of the CPU execution unit; a determination logic circuit 34 configured to determine whether the target instruction is contained in the thread queue to be executed; and a queue handling logic circuit 35 configured to, if the target instruction is not contained in the thread queue to be executed, flush the thread queue to be executed, obtain the target instruction and add the target instruction to the thread queue to be executed.

These logics can be implemented with appropriate circuit elements as needed. For example, the determination logic circuit 34 may be implemented with a number of comparators.

With this controller, the control process shown in FIG. 2 can be carried out to enhance the overall CPU execution efficiency by leveraging the advantages in instruction prediction and pre-fetching, while avoiding and preventing efficiency impairments arising from misprediction.

In some embodiments, a central processing unit (CPU) is provided. The CPU is communicatively connected to a memory, input units, and output units through a bus. The CUP includes the controller circuit (such as the one described above) communicatively connected to a plurality of CPU execution units.

Those skilled in the art should appreciate that the foregoing embodiments are presented to describe the objects, subject matter and benefits of the specification in greater detail. It will be also appreciated that presented above are merely embodiments of the specification, which do not limit the scope of the invention in any sense. Accordingly, any and all changes, equivalent alternatives, modifications and the like made to the subject matter of the specification are all intended to be embraced within the scope of the invention.

What is claimed is:

1. A method for executing instructions in a central processing unit (CPU), comprising:

sequentially fetching, from a current thread queue, a predetermined number of instructions;

determining whether the predetermined number of instructions includes a jump instruction;

in response to determining that the predetermined number of instructions does not include the jump instruction, forming a first instruction block containing the predetermined number of instructions;

in response to determining that the predetermined number of instructions includes the jump instruction, forming a second instruction block containing the jump instruction and all instructions preceding the jump instruction in the predetermined number of instructions, such that the second instruction block is formed with the jump instruction as its boundary, and the jump instruction is a last instruction in the second instruction block, wherein the second instruction block containing the jump instruction has fewer instructions than the first instruction block containing no jump instruction;

transmitting the first or second instruction block to a CPU execution unit for execution;

after transmitting the first or second instruction block to the CPU execution unit for execution, replenishing the current thread queue with at least one instruction to form a first thread queue to be executed;

after replenishing the current thread queue with the at least one instruction to form the first thread queue to be executed, suspending renaming and allocation of executable resources for subsequent instructions in the first thread queue to be executed;

after suspending the renaming and the allocation of executable resources, determining a target instruction of the jump instruction according to an execution result of the CPU execution unit;

determining whether the target instruction of the jump instruction is contained in the first thread queue to be executed;

in response to determining that the target instruction of the jump instruction is not contained in the first thread queue to be executed, flushing the first thread queue to be executed, obtaining the target instruction of the jump instruction and adding the target instruction of the jump instruction to the first thread queue to be executed;

after the target instruction of the jump instruction is added to the first thread queue to be executed, resuming the renaming and the allocation of executable resources for the first thread queue to be executed that includes the target instruction of the jump instruction; and feeding the first thread queue to be executed to a respective execution unit of the CPU and executing the first thread queue to be executed by the respective execution unit of the CPU.

2. The method according to claim 1, wherein the predetermined number of instructions is determined based on a number of CPU execution units of the CPU.

3. The method according to claim 1, wherein replenishing the current thread queue with the at least one instruction to form the first thread queue to be executed comprises:

replenishing the current thread queue with the at least one instruction corresponding to a predicted branch.

4. The method according to claim 1, wherein replenishing the current thread queue with the at least one instruction to form the first thread queue to be executed comprises:

replenishing the current thread queue with one or more instructions from a decoded cache, wherein the decoded cache stores a plurality of pre-fetched and decoded instructions.

5. The method according to claim 1, wherein the jump instruction is a register operation instruction.

6. The method according to claim 1, wherein the first or second instruction block further includes at least one memory operation instruction.

7. The method according to claim 6, wherein determining the target instruction of the jump instruction according to the execution result of the CPU execution unit comprises:

determining the target instruction of the jump instruction before execution of the at least one memory operation instruction is completed.

8. The method according to claim 1, wherein obtaining the target instruction of the jump instruction comprises:

determining whether the target instruction of the jump instruction is present in a decoded cache, wherein the decoded cache stores a plurality of pre-fetched and decoded instructions;

in response to determining that the target instruction of the jump instruction is present in the decoded cache, obtaining the target instruction of the jump instruction from the decoded cache; and in response to determining that the target instruction of the jump instruction is not present in the decoded cache, obtaining the target instruction of the jump instruction from a memory.

9. A central processing unit (CPU) controller circuit communicatively connected to a memory and a plurality of CPU execution units, the CPU controller circuit comprising:
an instruction fetching logic circuit configured to:
sequentially fetch, from a current thread queue, a predetermined number of instructions;
determine whether the predetermined number of instructions includes a jump instruction;
in response to determining that the predetermined number of instructions does not include the jump instruction, form a first instruction block containing the predetermined number of instructions;
in response to determining that the predetermined number of instructions includes the jump instruction, form a second instruction block containing the jump instruction and all instructions preceding the jump instruction in the predetermined number of instructions, such that the second instruction block is formed with the jump instruction as its boundary, and the jump instruction is a last instruction in the second instruction block, wherein the second instruction block containing the jump instruction has fewer instructions than the first instruction block containing no jump instruction; and
transmit the first or second instruction block to a first CPU execution unit for execution; an instruction replenishing logic circuit configured to: after the first or second instruction block is transmitted to the first CPU execution unit for execution, replenish the current thread queue with at least one instruction to form a first thread queue to be executed, and
after the current thread queue is replenished with the at least one instruction to form the first thread queue to be executed, suspend renaming and allocation of executable resources for subsequent instructions in the first thread queue to be executed;
a target determination logic circuit configured to, after suspending the renaming and the allocation of executable resources, determine a target instruction of the jump instruction according to an execution result of the first CPU execution unit;
a determination logic circuit configured to determine whether the target instruction of the jump instruction is contained in the first thread queue to be executed; and
a queue handling logic circuit configured to, in response to the target instruction of the jump instruction not being contained in the first thread queue to be executed, flush the first thread queue to be executed, obtain the target instruction of the jump instruction and add the target instruction of the jump instruction to the first thread queue to be executed,
wherein the instruction replenishing logic circuit resumes the renaming and the allocation of executable resources for the first thread queue to be executed that includes the target instruction of the jump instruction;

wherein the instruction fetching logic circuit feeds the first thread queue to be executed to a respective execution unit of the CPU; and wherein the respective execution unit of the CPU is configured to execute the first thread queue to be executed.

10. The CPU controller circuit according to claim 9, wherein
the predetermined number of instructions is determined based on a number of the plurality of CPU execution units.

11. The CPU controller circuit according to claim 9, wherein the instruction replenishing logic circuit is further configured to:
replenish the current thread queue with the at least one instruction corresponding to a predicted branch.

12. The CPU controller circuit according to claim 9, wherein the instruction replenishing logic circuit is further configured to:
replenish the current thread queue with one or more instructions from a decoded cache, wherein the decoded cache stores a plurality of pre-fetched and decoded instructions.

13. The CPU controller circuit according to claim 9, wherein the jump instruction is a register operation instruction.

14. The CPU controller circuit according to claim 9, wherein the first or second instruction block further includes at least one memory operation instruction.

15. The CPU controller circuit according to claim 14, wherein the target determination logic circuit is further configured to:
determine the target instruction of the jump instruction before execution of the at least one memory operation instruction is completed.

16. The CPU controller circuit according to claim 9, wherein the queue handling logic circuit is further configured to:
determine whether the target instruction of the jump instruction is present in a decoded cache, wherein the decoded cache stores a plurality of pre-fetched and decoded instructions;
in response to determining that the target instruction of the jump instruction is present in the decoded cache, obtain the target instruction of the jump instruction from the decoded cache; and
in response to determining that the target instruction of the jump instruction is not present in the decoded cache, obtain the target instruction of the jump instruction from the memory.

17. A central processing unit (CPU), comprising a controller circuit and a plurality of CPU execution units, wherein the controller circuit is communicatively connected to the plurality of CPU execution units and a memory, and the controller circuit comprises:
an instruction fetching logic circuit configured to:
sequentially fetch, from a current thread queue, a predetermined number of instructions;
determine whether the predetermined number of instructions includes a jump instruction;
in response to determining that the predetermined number of instructions does not include the jump instruction, form a first instruction block containing the predetermined number of instructions;
in response to determining that the predetermined number of instructions includes the jump instruction, form a second instruction block containing the jump instruction and all instructions preceding the jump instruction in the predetermined number of instructions, such that the second instruction block is formed with the jump instruction as its boundary, and the jump instruction is a last instruction in the second instruction block, wherein the second instruction block containing the jump instruction has fewer instructions than the first instruction block containing no jump instruction; and transmit the first or second instruction block to a first CPU execution unit for execution; an instruction replenishing logic circuit configured to:

after the first or second instruction block is transmitted to the first CPU execution unit for execution, replenish the current thread queue with at least one instruction to form a first thread queue to be executed, and after the current thread queue is replenished with the at least one instruction to form the first thread queue to be executed, suspend renaming and allocation of executable resources for subsequent instructions in the first thread queue to be executed;

a target determination logic circuit configured to, after suspending the renaming and the allocation of executable resources, determine a target instruction of the jump instruction according to an execution result of the first CPU execution unit;

a determination logic circuit configured to determine whether the target instruction of the jump instruction is contained in the first thread queue to be executed; and a queue handling logic circuit configured to, in response to the target instruction of the jump instruction not being contained in the first thread queue to be executed, flush the first thread queue to be executed, obtain the target instruction of the jump instruction and add the target instruction of the jump instruction to the first thread queue to be executed, wherein the instruction replenishing logic circuit resumes the renaming and the allocation of executable resources for the first thread queue to be executed that includes the target instruction of the jump instruction;

wherein the instruction fetching logic circuit feeds the first thread queue to be executed to a respective execution unit of the CPU; and wherein the respective execution unit of the CPU is configured to execute the first thread queue to be executed.

18. The CPU according to claim 17, wherein
the predetermined number of instructions is determined based on a number of the plurality of CPU execution units.

19. The CPU according to claim 17, wherein the instruction replenishing logic circuit is further configured to:
replenish the current thread queue with the at least one instruction corresponding to a predicted branch.

20. The CPU according to claim 17, wherein the instruction replenishing logic circuit is further configured to:
replenish the current thread queue with one or more instructions from a decoded cache, wherein the decoded cache stores a plurality of pre-fetched and decoded instructions.

* * * * *